US007930700B1

(12) United States Patent
Basu et al.

(10) Patent No.: US 7,930,700 B1
(45) Date of Patent: Apr. 19, 2011

(54) METHOD OF ORDERING OPERATIONS

(75) Inventors: Sujoy Basu, Menlo Park, CA (US); Ira Cohen, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1731 days.

(21) Appl. No.: 11/135,576

(22) Filed: May 23, 2005

(51) Int. Cl.
G06F 9/46 (2006.01)
G06F 9/44 (2006.01)
G06F 9/45 (2006.01)
G06F 7/60 (2006.01)
G06F 15/18 (2006.01)

(52) U.S. Cl. ............ 718/102; 718/100; 718/106; 703/2; 703/21; 703/22; 706/12; 706/16; 706/21; 717/127; 717/130; 717/131

(58) Field of Classification Search .................. 718/100, 718/101, 102, 105; 707/8, 100; 709/206, 709/232

See application file for complete search history.

(56) References Cited

U.S. PATENT DOCUMENTS

| 5,423,040 | A | * | 6/1995 | Epstein et al. ................ 718/102 |
| 5,465,354 | A | * | 11/1995 | Hirosawa et al. ............. 718/106 |
| 5,506,999 | A | * | 4/1996 | Skillman et al. .............. 718/105 |
| 5,577,240 | A | * | 11/1996 | Demers et al. .................... 707/8 |
| 5,684,971 | A | * | 11/1997 | Martell et al. ................. 712/217 |
| 5,958,003 | A | * | 9/1999 | Preining et al. ............... 718/100 |
| 6,108,648 | A | * | 8/2000 | Lakshmi et al. ....................... 1/1 |
| 6,199,068 | B1 | * | 3/2001 | Carpenter ..................... 707/100 |
| 6,327,581 | B1 | * | 12/2001 | Platt ................................. 706/12 |
| 6,463,580 | B1 | * | 10/2002 | Wilkerson ..................... 717/149 |
| 6,687,257 | B1 | * | 2/2004 | Balasubramanian ......... 370/429 |
| 6,715,145 | B1 | * | 3/2004 | Bowman-Amuah .......... 718/101 |
| 6,944,862 | B2 | * | 9/2005 | Caggese et al. ............... 718/102 |
| 6,957,433 | B2 | * | 10/2005 | Umberger et al. ............ 718/103 |
| 7,099,815 | B2 | * | 8/2006 | Christodoulou et al. ........ 703/21 |
| 7,418,705 | B2 | * | 8/2008 | Kanai et al. ................... 718/102 |
| 7,660,705 | B1 | * | 2/2010 | Meek et al. ........................ 703/2 |
| 2002/0042835 | A1 | * | 4/2002 | Pepin et al. .................... 709/232 |
| 2003/0041110 | A1 | * | 2/2003 | Wenocur et al. .............. 709/206 |

(Continued)

FOREIGN PATENT DOCUMENTS

WO WO-02-03192 A2 1/2002

OTHER PUBLICATIONS

Peter A. Dinda et al., Host Load Prediction Using Linear Models, Cluster Computing, 2001.

(Continued)

*Primary Examiner* — Meng-Ai An
*Assistant Examiner* — Abdullah Al Kawsar (57) ABSTRACT

An embodiment of a method of ordering operations begins with a first step of a computing entity storing a training data set, which includes previously executed operation pairs, attribute data, and relative cost data. In a second step, the computing entity forms a predictor. In a third step, the computing entity applies the predictor to an operation pair of first and second to-be-executed operations to determine a predicted relative cost between the first and second to-be-executed operations. Another embodiment of the method comprises the first step, the second step, an alternative third step, and a fourth step. In the alternative third step, the computing entity applies the predictor to to-be-executed operations in operation pairs to determine a predicted relative cost between first and second operations for each operation pair. In the fourth step, the computing entity employs the operation pairs and the predicted relative costs to sort the to-be-executed operations.

34 Claims, 2 Drawing Sheets

U.S. PATENT DOCUMENTS

| | | | |
|---|---|---|---|
| 2004/0226013 A1* | 11/2004 | Mariotti et al. | 718/100 |
| 2005/0028188 A1* | 2/2005 | Latona et al. | 725/13 |
| 2005/0149937 A1* | 7/2005 | Pilkington | 718/102 |
| 2005/0166205 A1* | 7/2005 | Oskin et al. | 718/103 |
| 2005/0240922 A1* | 10/2005 | Fromherz | 718/100 |
| 2006/0136396 A1* | 6/2006 | Brobst | 707/3 |

OTHER PUBLICATIONS

Peter A. Dinda, Online Prediction of the Running Time of Tasks, 2001, Springer Science + Business Media B. V. (formerly Kluwer Academic Publishing), Berlin, Germany.

Nir Friedman et al., Bayesian Network Classifiers, 1997, Springer Science+Business Media B. V. (formerly Kluwer Academic Publishing), Berlin, Germany.

Richard Gibbons, A Historical Application Profiler for Use by Parallel Schedulers, 1997.

Ole-Christoffer Granmo et al., Real-time Hypothesis Driven Feature Extraction on Parallel Processing Architectures, 2002.

Michael A. Iverson et al., Run-Time Statistical Estimation of Task Execution Times for Heterogeneous Distributed Computing, 1996.

Michael A. Iverson et al., Statistical Prediction of Task Execution Times Through Analytic Benchmarking for Scheduling in a Heterogeneous Environment, 1999.

Warren Smith et al., Predicting Application Run Times Using Historical Information, 1998.

Warren Smith et al., Using Run-Time Predictions to Estimate Queue Wait Times and Improve Scheduler Performance, 1999.

Ian H. Witten et al., Data Mining: Practical Machine Learning Tools and Techniques with Java Implementations, 2000, Morgan Kaufman Publishers, San Francisco, CA.

* cited by examiner

Table 1

Training Data Set

| Operation Pairs | First Attribute Data Set $A(1)$ | | | | | Second Attribute Data Set $A(2)$ | | | | | Relative Cost |
|---|---|---|---|---|---|---|---|---|---|---|---|
| | $A(1,1)$ | $A(1,2)$ | $A(1,3)$ | ... | $A(1,n)$ | $A(2,1)$ | $A(2,2)$ | $A(2,3)$ | ... | $A(2,n)$ | $V(1) > V(2)?$ |
| $o(1), o(2)$ | $a(1,1)$ | $a(1,2)$ | $a(1,3)$ | ... | $a(1,n)$ | $a(2,1)$ | $a(2,2)$ | $a(2,3)$ | ... | $a(2,n)$ | True or False? |
| $o(1), o(3)$ | $a(1,1)$ | $a(1,2)$ | $a(1,3)$ | ... | $a(2,n)$ | $a(3,1)$ | $a(3,2)$ | $a(3,3)$ | ... | $a(3,n)$ | " |
| ... | ... | ... | ... | ... | ... | ... | ... | ... | ... | ... | " |
| $o(2), o(3)$ | $a(2,1)$ | $a(2,2)$ | $a(2,3)$ | ... | $a(2,n)$ | $a(3,1)$ | $a(3,2)$ | $a(3,3)$ | ... | $a(3,n)$ | " |
| $o(2), o(4)$ | $a(2,1)$ | $a(2,2)$ | $a(2,3)$ | ... | $a(2,n)$ | $a(4,1)$ | $a(4,2)$ | $a(4,3)$ | ... | $a(4,n)$ | " |
| ... | ... | ... | ... | ... | ... | ... | ... | ... | ... | ... | |
| $o(m-1), o(m)$ | $a(m-1,1)$ | $a(m-1,2)$ | $a(m-1,3)$ | ... | $a(m-1,n)$ | $a(m,1)$ | $a(m,2)$ | $a(m,3)$ | ... | $a(m,n)$ | " |

FIG. 3

METHOD OF ORDERING OPERATIONS

FIELD OF THE INVENTION

The present invention relates to the field of scheduling. More particularly, the present invention relates to the field of scheduling where a need exists for ordering of operations.

BACKGROUND OF THE INVENTION

Scheduling is a basic research problem in both computer science and operations research that seeks to assign resources to operations (e.g., tasks or jobs). The space of problems is vast. Often lists of operations are employed when scheduling operations. For example, a list scheduling dispatcher may assign operations to resources by choosing an executable operation that is closest to a head of a list when processing resources become available.

A number of techniques exist for determining an order of a list of operations that is to be used in a scheduling context. These techniques first determine a cost for each operation and then sort the operations by the determined cost. Specific techniques for determining the costs of operations include regression trees, model trees, linear regression, and nearest neighbor algorithms. Typically, the determined costs for these techniques are predicted operation execution times. Often, the determination of costs is error-prone resulting in under-estimation and over-estimation of costs to varying degrees.

An alternative to determining a list of operations is to categorize operations into broad classifications. For example, a technique used for scheduling computer processing operations is to divide operations into high cost operations and low cost operations by identifying a threshold that divides the high and low cost operations. Such a technique fails to take advantage of ordering operations into a list and the associated benefits of using the list in scheduling.

SUMMARY OF THE INVENTION

The present invention comprises a method of ordering operations. According to an embodiment, the method of ordering operations begins with a first step of a computing entity storing a training data set. The training data set comprises previously executed operation pairs, attribute data, and relative cost data. The attribute data for each previously executed operation pair comprises first attribute data for a first previously executed operation and second attribute data for a second previously executed operation. The relative cost data for each previously executed operation pair comprises a relative cost indicator between the first and second previously executed operations. In a second step, the computing entity forms a predictor from the training data set. In a third step, the computing entity applies the predictor to an operation pair of first and second to-be-executed operations to determine a predicted relative cost between the first and second to-be-executed operations.

According to another embodiment, the method of ordering operations comprises the first step, the second step, an alternative third step, and a fourth step. In the alternative third step, the computing entity applies the predictor to to-be-executed operations in operation pairs to determine a predicted relative cost between first and second operations for each operation pair. In the fourth step, the computing entity employs the operation pairs and the predicted relative costs to sort the to-be-executed operations into a list.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention is a method of ordering operations. The operations ordered by the method include tasks and jobs where a job includes one or more tasks. For example, a number of single task jobs may be ordered according to their expected relative processing costs or a number of jobs that include multi-task jobs may be ordered according to their expected relative processing costs. Or, for example, a number of tasks that include tasks from multi-task jobs may be ordered according to their expected relative processing costs.

The present invention may be used in the scheduling of processing of computer animation clips in a multi-processor computing environment or in the scheduling of processing of other computer processing jobs. Further, the present invention may be used in the scheduling of jobs other than computer processing jobs.

Figure 1:
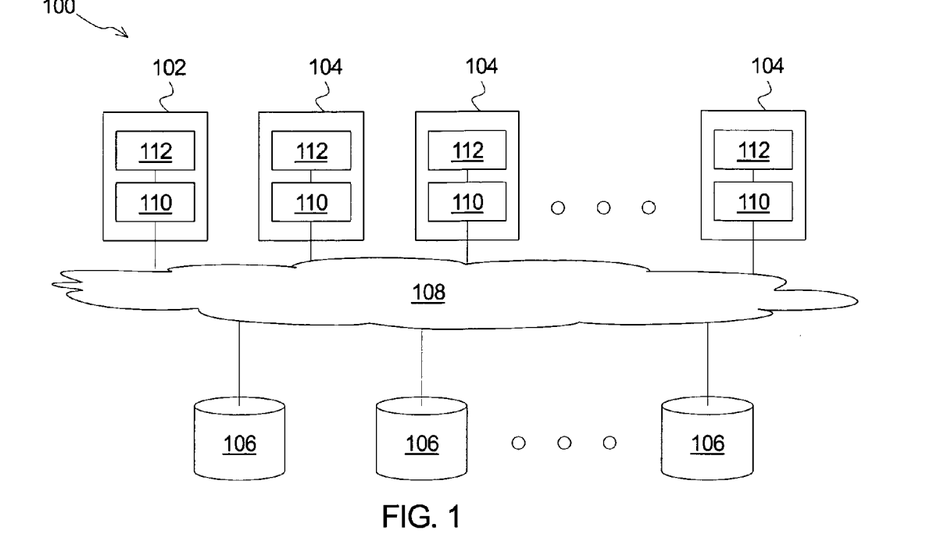
FIG. 1 illustrates a multi-processor computing environment that employs a method of ordering operations in accordance with an embodiment of the present invention.

An embodiment of a multi-processor computing environment that employs a method of ordering operations of the present invention is schematically illustrated in FIG. 1. The multi-processor computing environment 100 comprises a scheduler 102, a plurality of servers 104, and storage units 106, which are coupled together by a network 108. In an embodiment, the scheduler 102 comprises a processor 110 and memory 112. In an embodiment, each server 104 comprises a processor 110 and memory 112. In another embodiment, one or more servers 104 further comprise one or more additional processors. In an alternative embodiment, the scheduler 102 and the servers 104 are coupled by the network 108 and the storage units 106 are coupled to the dispatcher 102 and the servers 104 by a SAN (storage area network). More generally, a multi-processor computing environment that employs a method of ordering operations of the present invention includes a plurality of processors, memory, and storage. The memory 112 and storage units 106 are examples of computer readable media. In this general multi-processor computing environment, one or more of the processors acts as a scheduler. The scheduler is a computing entity that performs a method of ordering operations of the present invention. The computing entity may be a single computer (e.g., the scheduler 102) or it may be multiple computers that cooperate to perform the method of ordering operations of the present invention.

The multi-processor computing environment 100 processes jobs each of which is made up of one or more tasks. Some or all of the jobs may each include a plurality of tasks and precedence constraints among the plurality of tasks. In an embodiment, each of the jobs includes a series of stages. Each stage includes computational tasks that may be executed in parallel. All tasks in a stage must complete before any tasks in the next stage may begin execution. In other words, the tasks in a later stage are subject to a precedence constraint that requires the preceding stage's tasks finish processing before any of the tasks in the later stage may begin processing. There are no precedence constraints between tasks of different jobs. The processing of the tasks is preferably non-preemptive; once processing of a task begins, it must complete its processing. Alternatively, a task may begin processing, be killed, and then be re-started at its beginning or it may be checkpointed, killed, and restarted from the checkpoint.

In an embodiment, the multi-stage jobs comprise a batch of animation processing jobs. For example, the batch of animation processing jobs may be brief excerpts of a computer-animated film that is in production. Typically, each of the brief excerpts is processed in a series of stages which must be processed in a particular order. For example, the series of stages may begin with simulation of physical movement followed by model baking, then frame rendering, and concluding with film clip assembly.

Other computer processing jobs have a similar multi-stage structure in which stages include tasks that may be executed in parallel and later stages are subject to precedence constraints that require tasks in an earlier stage to complete processing before the tasks of the later stage may begin processing. Examples include protein sequence matching, certain classes of fast Fourier transform computations, petroleum exploration workloads, and distributed data processing.

More generally, the jobs may include a plurality of tasks in which later tasks are subject to precedence constraints imposed by earlier tasks and in which some tasks may be executed in parallel. Such jobs may be characterized as a set of DAGs (directed acyclic graphs) in which nodes represent tasks, edges represents precedence constraints, and each DAG represents a job. Each DAG has an estimated total processing time, which is the time to process the job on a single machine. Each DAG also has an associated critical path length, which is the amount of time that is required to complete the job on an unlimited number of machines.

Figure 2:
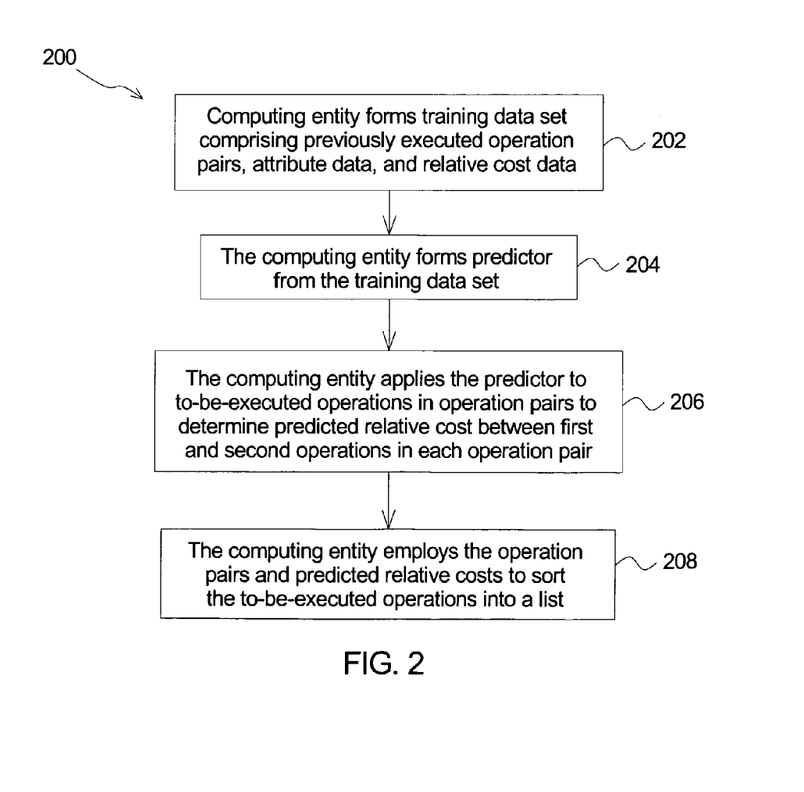
FIG. 2 illustrates an embodiment of a method of ordering operations of the present invention as a flow chart.

An embodiment of a method of ordering operations of the present invention is illustrated as a flow chart in FIG. 2. The method 200 begins with a first step 202 of a computing entity (e.g., the scheduler 102 of FIG. 1) storing a training data set comprising previously executed operation pairs, attribute data, and relative cost data. The previously executed operation pairs are formed from a set of previously executed operations. For example, in a computer animation instantiation, the previously executed operations may be the previously executed animation processing jobs executed over a recent processing period (e.g., the previous sixty days). Given a set of m previously executed operations, $(m^2-m)/2$ unique previously executed operation pairs may be formed. For example, for operations $O=\{o(1), o(2), \ldots, o(m)\}$, the previously executed operations pairs $P=\{p(1), p(2), \ldots, p[(m^2-m)/2]\}$ may be given by:

$$p(1) = o(1), o(2)$$
$$p(2) = o(1), o(3)$$
$$\vdots$$
$$p(m) = o(2), o(3)$$
$$p(m+1) = o(2), o(4)$$
$$\vdots$$
$$p[(m^2 - m)/2] = o(m-1), o(m)$$

Each previously executed operation has a set of attributes $A=\{a(1), a(2), \ldots, a(n)\}$ associated with it. For example, a first previously executed operation $o(1)$ may have the attributes $A[o(1)]=\{a(1,1), a(1,2), \ldots, a(1,n)\}$ where $a(1,1)$, $a(1,2), \ldots, a(1,n)$ are the first previously executed operation's first attribute, second attribute, and nth attribute, respectively. A second previously executed operation $o(2)$ may have the attributes $A[o(2)]=\{a(2,1), a(2,2), \ldots, a(2,n)\}$ where $a(2,1), a(2,2), \ldots, a(2,n)$ are the second previously executed operation's first attribute, second attribute, and nth attribute, respectively.

Exemplary attributes include a project identifier for the operation, one or more computer processing operation types being performed, a user or user group associated with the operation, one or more input metrics for the operation, one or more output metrics for the operation, and a combination thereof. For example, in the context of computer animation processing attributes may include movie name, resolution of the animation processing (e.g., high, medium, or low resolution), team of animators associated with the operation, and number of frames being processed.

The attribute data for each previously executed operation pair including a first attribute data set $A(1)=\{A(1,1), A(1,2), \ldots, A(1,n)\}$ for a first previously executed operation and a second attribute data set $A(2)=\{A(2,1), A(2,2), \ldots, A(2,n)\}$ for a second previously executed operation, where $A(1,1), A(1,2), \ldots, A(1,n), A(2,1), A(2,2), \ldots, A(2,n)$ are data categories. The data categories may be classifications such as nominal, categorical, or ordinal categories, or they may be numeric (e.g, integers or real numbers), or they may be a combination thereof.

Each previously executed operation has a cost V associated with it. For example, the cost V for an operation may be resource usage, execution time, processing time, critical path length for a multi-task job, total processing time for a multi-task job, or a combination thereof. The relative cost data for each previously executed operation pair includes a relative cost indicator between the first and second previously executed operations. For example, for first and second previously executed operations, $o(1)$ and $o(2)$, the relative cost indicator may be true or false for the inequality comparison of $V[o(1)]>V[o(2)]$. That is, if the first cost $V[o(1)]$ for the first previously executed operation $o(1)$ exceeds a second cost $V[o(2)]$ for the second previously executed operation $o(2)$, the relative cost indicator is true; otherwise, the relative cost indicator is false.

In an embodiment, the training data set is collected into a table (e.g., as a data structure stored in memory). For example, the training data set may be collected into Table 1, which is provided as FIG. 3. Table 1 has four main sections: Previously executed operation pairs, a first attribute data set A(1), a second attribute data set A(2), and a relative cost. The first and second attribute data sets, A(1) and A(2), are each further divided into first through nth attribute categories of $A(1,1), A(1,2), \ldots, A(1,n)$ and $A(2,1), A(2,2), \ldots, A(2,n)$, respectively. For example, attribute category $A(1, 1)$ is the first attribute data set's first attribute category and attribute category $A(2, n)$ is the second attribute data set's nth attribute category. Previously executed operations $o(1), o(2), \ldots, o(m)$ are combined into $(m^2-m)/2$ previously executed operation pairs. The relative cost answers the question of whether the cost $V(1)$ of the first operation of the previously executed operation pair is greater than the cost $V(2)$ of the second operation of the previously executed operation pair.

Figure 3:
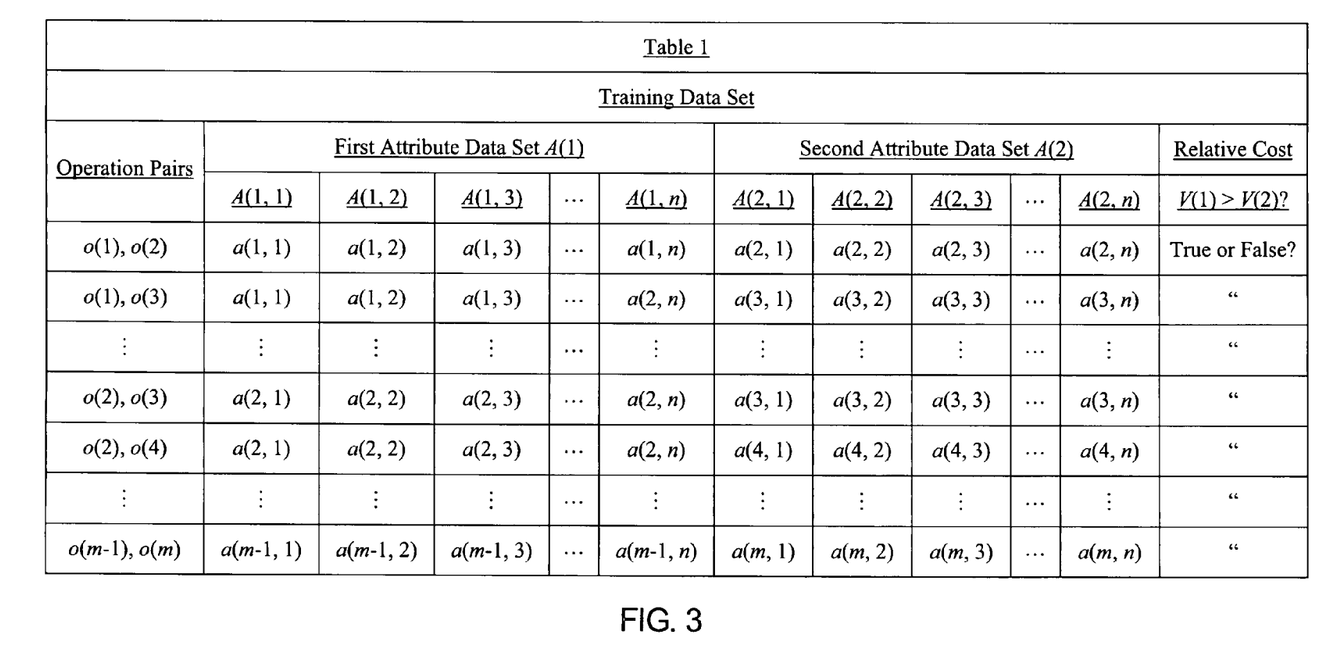
FIG. 3 provides a table of a training data set in accordance with an embodiment of the present invention.

Reading across the first line of tabular data of Table 1, a previously executed operation pair has previously executed operations, o(1) and o(2). Because the previously executed operation o(1) has a first position in the order of the previously executed operation pair o(1), o(2), attributes a(1, 1), a(1, 2), a(1, 3), . . . , a(1, n) are assigned to the first attribute data set A(1). Similarly, because the previously executed operation o(2) has a second position in the order of the previously executed operation pair o(1), o(2), attributes a(2, 1), a(2, 2), a(2, 3), . . . , a(2, n) are assigned to the second attribute data set A(2). Note that in two rows at the middle of Table 1, the previously executed operation o(2) has a first position in the order of the previously executed operation pair and, consequently for these rows, has its attributes, a(2, 1), a(2, 2), a(2, 3), . . . , a(2, n), listed under the first attribute data set A(1). The order of the previously executed operation pair determines whether to list the attributes of an operation under the first attribute data set A(1) or the second attribute data set A(2); flipping the previously executed operation pair also flips the assignment between the first attribute data set A(1) and the second attribute data set A(2).

Numeric categories of attributes may be "discretized" so that all attributes are provided as classifications. To "discretize" is to convert numeric values into classifications by numeric range. For example, in an instantiation for computer animation processing, one of the categories may be frame count (i.e., the number of frames processed in an animation processing job). The frame count category may be discretized by grouping frame counts in count lots of 100. For example, a first frame class may be a frame count less than or equal to 100 frames, a second frame class may be a frame count of greater than 100 frames and less than or equal to 200 frames, and so forth. Some numeric categories might be sufficiently grouped so that they may be used as classifications without further discretizing.

In an embodiment of the present invention, the operation pairs of the training data set of Table 1 are ordered in an established way. Such an established way determines the first operation of the operation pair and the second operation. For example, the order of the operation pair may be determined by first comparing the first attributes of the operation pair and choosing the operation that has its first attribute classification at a lower order than the other operation's first attribute classification. For instance, the order of the operation pair o(1), o(2) may be determined by comparing their first attributes a(1, 1) and a(2, 1). If a(1, 1)<a(2, 1), the order is established as o(1), o(2). If a(1, 1)>a(2, 1), the order is established as o(2), o(1). And, if a(1, 1)=a(2, 1), the second attributes a(1, 2) and a(2, 2) are compared. If a(1, 2)=a(2, 2), the third attributes a(1, 3) and a(2, 3) are compared. Such an ordering of operations pairs can be established in other ways. For example, operations may be sorted by attribute order prior to forming the operation pairs such that operation o(1) has a lower attribute order than operation o(2), operation o(2) has a lower attribute order than operation o(3), and so forth. Using this latter technique places the operations in the operation pairs as indicated in Table 1.

Discretized numeric attributes and some other attribute classification such as ordinals (e.g., first, second, third, etc.) have an inherent order. Other attribute classifications such a nominal classification (i.e., a classification by name such as a project name) may be ordered using an alphabetic order or some other defined order (e.g., as provided by a hash function that returns integers).

Returning to FIG. 2, the computing entity forms a predictor from the training data set in a second step 204. Preferably, the predictor is a probability classifier (e.g., a Bayesian classifier), embodiments of which are described below. Alternatively, the predictor is another type of classifier such as a decision tree classifier, a nearest neighbor classifier, a rule based classifier, a linear classifier, or a support vector machine classifier.

An embodiment of a decision tree classifier of the present invention includes a plurality of nodes that test attribute values against constants or against other attribute values of the same test instance. Based on the outcome of the comparison, the test instance is routed along a path of the tree. When a leaf node is reached, the leaf node's class label (e.g., a first cost exceeds a second cost) is assigned to the test instance.

An embodiment of a nearest neighbor classifier of the present invention employs a distance metric such as a Euclidean distance if all attributes are numeric. For nominal attributes, the distance between two values may be zero if they are identical, and one otherwise. Attributes may be weighted in the distance metric to attach different importance to different attributes. Based on the distance metric, the k nearest neighbors are identified, where k may be a parameter. The majority class of these k neighbors (e.g., a first cost does not exceed a second cost) is then assigned to the test instance.

An embodiment of a rule-based classifier generates classification rules from the test data set. Each rule can test one or more attribute values, and predict the class. A rule may have a measure of goodness based on the training data, so that among all applicable rules for a test instance, the rule with a highest measure of goodness may be used to predict the class.

An embodiment of a linear classifier may be employed when all attributes are numeric or have been suitably converted to numeric values. A linear regression may be performed for each class, setting the output equal to one for training instances that belong to the class and zero for those that do not. This results in a linear expression for each class. A test instance may be classified by computing the linear expression for each class and selecting the class that gives the largest value.

An embodiment of a support vector machine classifier is an extension of a linear classifier that maps the original set of attributes into a new space using a nonlinear mapping of the attributes. A linear system may be trained for each class and a test instance is assigned to the class for which the greatest output is obtained. Other non-linear regression techniques may be employed as well.

An embodiment of a probability classifier of the present invention employs a plurality of attribute classification tables. Data for each attribute category of the first and second attribute data sets is collected in its own attribute classification table. For example, data for the first attribute data set's first attribute category A(1,1) is collected in a first attribute classification table, data for the first attribute data set's second attribute category A(1,2) is collected in a second attribute classification table, data for the second attribute data set's first attribute category A(2,1) is collected in an nth+1 table, and so forth. Each of the attribute classification table collects counts of true and false relative costs by attribute classes.

An exemplary attribute classification table is provided as Table 2. The exemplary attribute classification table provides frame count classes for a frame number attribute as part of ordering animation processing jobs. The first column of the exemplary attribute classification table identifies the frame count classes. The second and third columns identify counts of true and false answers to the relative cost question (e.g., V(1)>V(2)?), respectively.

TABLE 2

Exemplary Frame Count Classification Table

| Classes | True | False |
|---|---|---|
| frames ≤ 100 | T(1) | F(1) |
| 100 < frames ≤ 200 | T(2) | F(2) |
| 200 < frames ≤ 300 | T(3) | F(3) |
| . | . | . |
| . | . | . |
| . | . | . |
| x * 100 < frames ≤ x * 100 | T(x) | F(x) |

An embodiment of the probability classifier further employs a plurality of conditional probability tables. Conditional probabilities for each attribute category of the first and second attribute data sets is collected in its own conditional probability table. For example, conditional probabilities for the first attribute data set's first attribute category A(1,1) is collected in a first conditional probability table, conditional probabilities for the first attribute data set's second attribute category A(1,2) is collected in a second conditional probability table, and so forth.

An exemplary conditional probability table is provided as Table 3. The exemplary conditional probability table provides conditional probabilities for frame count classes for a frame number attribute as part of ordering animation processing jobs. The first column of the exemplary attribute classification table identifies the frame count classes. The second and third columns identify the conditional probabilities for true and false, respectively. The sum of the true and false counts, ΣT and ΣF, are specific to each conditional probability table and may be given by the following two equations for Table 3.

$$\Sigma T = T(1) + T(2) + T(3) + \ldots + T(x)$$

$$\Sigma F = F(1) + F(2) + F(3) + \ldots + F(x)$$

TABLE 3

Exemplary Frame Count Conditional Probabilities Table

| Classes | True Conditional Prob. | False Conditional Prob. |
|---|---|---|
| frames ≤ 100 | T(1)/ΣT | F(1)/ΣF |
| 100 < frames ≤ 200 | T(2)/ΣT | F(2)/ΣF |
| 200 < frames ≤ 300 | T(3)/ΣT | F(3)/ΣF |
| . | . | . |
| . | . | . |
| . | . | . |
| x * 100 < frames ≤ x * 100 | T(x)/ΣT | F(x)/ΣF |

In another embodiment, the attribute classification table and the conditional probability table for each of the attribute categories, A(1,1) ... A(1,n), A(2,1) ... A(2,n), are collected in a combined attribute classification and conditional probability table. In such an embodiment, a combined attribute classification and conditional probability table exists for each of the attribute categories, A(1,1) ... A(1,n), A(2,1) ... A(2,n).

It will be readily apparent to one skilled in the art that the attribute classification tables and the conditional probability tables, or the combined attribute classification and conditional probability tables are data structures that may be replaced by any of a range of alternative data structures.

The method 200 (FIG. 2) continues with a third step 206 in which the computing entity applies the predictor to to-be-executed operations in operation pairs θ(i), θ(j), to determine a predicted relative cost between first and second operations, θ(i) and θ(j), for each operation pair. In an alternative embodiment of the method 200, the third step 206 is applied to a single pair of to-be-executed operations.

In an embodiment, the first and second operations, θ(i) and θ(j), are ordered in the established way used to order the previously executed operations of the previously executed operations pairs. In an embodiment in which the predictor is a probability classifier, the probability classifier returns a probability that the relative cost question is true.

An embodiment of the probability classifier provides the probability that V[θ(i)]>V[θ(j)] is true given attributes A[θ(i)] and A[θ(j)] where A[θ(i)]={a(i, 1), a(i, 2), a(i, 3), ..., a(i, n)} and A[θ(j)]={a(j, 1), a(j, 2), a(j, 3), ..., a(j, n)}. The probability classifier may be characterized a Bayesian classifier. Bayesian classifiers employ Bayes rule that states that the probability of a hypothesis H given evidence E is the product of the conditional probability of the evidence E given the hypothesis H and the probability of the hypothesis H divided by the probability of the evidence E. Bayes rule may be given by equation (1).

$$P(H \mid E) = \frac{P(H \mid E) \cdot P(H)}{P(E)} \tag{1}$$

An application of Bayes rule to determine the probability that a first cost V(i) of a first to-be-executed operation θ(i) is greater than a second cost V(j) of a second to-be-executed operation θ(j) yields that the probability of true given the evidence of attributes A[θ(i)] and A[θ(j)] is the product of the conditional probability of A[θ(i)] and A[θ(j)] given true and the probability of true divided by the probability of A[θ(i)] and A[θ(j)]. Mathematically, the probability of true may be given by equation (2).

$$P\{T \mid A[\theta(i)] \wedge A[\theta(j)]\} = \frac{P\{A[\theta(i)] \wedge A[\theta(j)] \mid T\} \cdot P(T)}{P\{A[\theta(i)] \wedge A[\theta(j)]\}} \tag{2}$$

Similarly, the probability of false may be given by equation (3).

$$P\{F \mid A[\theta(i)] \wedge A[\theta(j)]\} = \frac{P\{A[\theta(i)] \wedge A[\theta(j)] \mid F\} \cdot P(F)}{P\{A[\theta(i)] \wedge A[\theta(j)]\}} \tag{3}$$

Since the probabilities of true and false sum to one, the probability of A[θ(i)] and A[θ(j)] may be given by:

$$P\{A[\theta(i)] \wedge A[\theta(j)]\} = \tag{4}$$
$$P\{A[\theta(i)] \wedge A[\theta(j)] \mid T\} \cdot P(T) + P\{A[\theta(i)] \wedge A[\theta(j)] \mid F\} \cdot P(F)$$

Probabilities of true and false are determined by summing the true counts and the false counts to determine a total true count and a total false count, respectively, and dividing each by the sum of the total true count and the total false count. Mathematically, the probabilities of true and false may be given by equations (5) and (6) in which the term "∀p" denotes that the sums are over all previously executed operation pairs p under consideration.

$$P(T) = \sum_{\forall p} T \Big/ \sum_{\forall p} (T+F) \quad (5)$$

$$P(F) = \sum_{\forall p} F \Big/ \sum_{\forall p} (T+F) \quad (6)$$

If attributes are independent, the conditional probabilities of the attributes given true may be determined from the product of individual conditional probabilities. Mathematically, this may be given by equations (7) and (8).

$$P\{A[\theta(i)] \wedge A[\theta(j)] \mid T\} = P[a(i,1)] \mid T] \cdot P[a(i,2)] \mid T] \ldots P[a(i,n)] \mid T] \cdot P[a(j,1)] \mid T] \cdot P[a(j,2)] \mid T] \ldots P[a(j,n)] \mid T] \quad (7)$$

$$P\{A[\theta(i)] \wedge A[\theta(j)] \mid F\} = P[a(i,1)] \mid F] \cdot P[a(i,2)] \mid F] \ldots P[a(i,n)] \mid F] \cdot P[a(j,1)] \mid F] \cdot P[a(j,2)] \mid F] \ldots P[a(j,n)] \mid F] \quad (8)$$

In an embodiment, the conditional probabilities of the attributes are assumed independent. In such an embodiment, results of predictions may be compared to actual results following processing of the to-be executed operations. If the actual results compare favorably to the predictions the assumption may be justified. If the actual results compare unfavorably, dependencies among the attribute may be determined and adjustments may be made to the attribute categories, or equations (7) and (8), or both the attribute categories and equations (7) and (8). The field of machine learning may be referred to for techniques for dealing with dependencies among attributes. For example, consider a situation where a first attribute a(i, 1) is dependent on a second attributed a(i, 2) and there are no other dependencies. In this situation, equation (7) may be changed by replacing P[a(i, 1)|T] with P[a(i, 1)|a(i, 2)^T] and equation (8) may be changed by replacing P[a(i, 1)|F] with P[a(i, 1)|a(i, 2)^F]. With these changes to equations (7) and (8), the probability classifier may be characterized as a Bayesian network classifier.

In an embodiment, equations (7) and (8) are solved using conditional probabilities tables (e.g., the exemplary conditional probability table provided as Table 3) to determine the conditional probabilities for the attributes $A[\theta(i)]$ and $A[\theta(j)]$ given true and false, respectively, for each operation pair $\theta(i)$, $\theta(j)$. Then, equation (4) is solved to determine the probability of the attributes $A[\theta(i)]$ and $A[\theta(j)]$ for each operation pair $\theta(i)$, $\theta(j)$. Finally, equation (2) is solved for the probability of true for each operation pair $\theta(i)$, $\theta(j)$, which is the predicted relative costs for each operation pair $\theta(i)$, $\theta(j)$.

In a fourth step 208 of the method 200 (FIG. 2), the computing entity employs the operation pairs and the predicted relative costs to sort the to-be-executed operations $\Theta=\{\theta(1), \theta(2), \ldots, \theta(r)\}$ into a list. The operations may be sorted according to increasing or decreasing cost. In the alternative embodiment in which the third step 206 determines a predicted relative cost for a single pair of operations, the predicted relative cost may in itself provide the order of operations without application of the fourth step 208.

A description of an embodiment of sorting of the to-be-executed operations $\Theta=\{\theta(1), \theta(2), \ldots, \theta(r)\}$ into a list follows: Consider a first to-be-executed operation pair $\theta(1)$, $\theta(2)$. If the predicted relative cost of the to-be-executed operation $\theta(1)$ exceeds the predicted relative cost of the to-be-executed operation $\theta(2)$, an initial order in decreasing cost is established as $\theta(1)$, $\theta(2)$. Otherwise, the predicted relative cost establishes the initial order in decreasing cost is established as $\theta(2)$, $\theta(1)$. Mathematically, this may be determined from the probability of true $P\{V[\theta(1)]>V[\theta(2)]|T\}$ for the to-be-executed operation pair $\theta(1)$, $\theta(2)$, which is given above as the probability of true $P\{A[\theta(1)]^\wedge A[\theta(2)]|T\}$ for attributes $A[\theta(1)]$ and $A[\theta(2)]$. If the probability of true is at least 0.5, the initial order in decreasing cost is established as $\theta(1)$, $\theta(2)$. Otherwise, the initial order in decreasing cost is established as $\theta(2)$, $\theta(1)$. Further discussion here assumes that the initial order in decreasing cost is established here as $\theta(1)$, $\theta(2)$.

Next, consider a third to-be-executed operation $\theta(3)$ relative to the initial order of $\theta(1)$, $\theta(2)$. The probability that the sorted order is $\theta(3)$, $\theta(1)$, $\theta(2)$ may be given by equation (9) where the numbers 3, 2, and 1 indicate $\theta(3)$, $\theta(1)$, and $\theta(2)$, respectively.

$$P(3,1,2|1,2) = P[V(3)>V(1)] \cdot P[V(3)>V(2)] \quad (9)$$

Similarly, the probability that the sorted order is $\theta(1)$, $\theta(3)$, $\theta(2)$ and $\theta(1)$, $\theta(2)$, $\theta(3)$ may be given by equations (10) and (11), respectively.

$$P(1,3,2|1,2) = P[V(1)>V(3)] \cdot P[V(3)>V(2)] \quad (10)$$

$$P(1,2,3|1,2) = P[V(1)>V(3)] \cdot P[V(2)>V(3)] \quad (11)$$

Given the initial order of $\theta(1)$, $\theta(2)$, the sorted order of the first, second, and third operations, $\theta(1)$, $\theta(2)$, and $\theta(3)$, is provided by the maximum of equations (9), (10), and (11). This may be continued for each of the remaining to-be-executed operations $\theta(4)$, $\theta(5)$, ..., $\theta(r)$ in which first the position of $\theta(4)$ is determined in the sorted order, then the position of $\theta(5)$ is determined in the sorted order, and so forth until the position of $\theta(r)$ is determined in the sorted order.

It is observed that equations (10) and (11) may be rewritten as equations (10a) and (11a).

$$P(1,3,2|1,2) = \frac{P(3,1,2|1,2)}{P[V(3)>V(1)]} \cdot \{1 - P[V(3)>V(1)]\} \quad (10a)$$

$$P(1,2,3|1,2) = \frac{P(1,3,2|1,2)}{P[V(3)>V(2)]} \cdot \{1 - P[V(3)>V(2)]\} \quad (11a)$$

This observation leads to a more efficient technique for determining the sorted order for an sth+1 to-be-executed operation given the sorted order of $\theta(1)$, $\theta(2)$, ..., $\theta(s)$ for s to-be-executed operations. The more efficient technique first calculates $P(s+1, 1, 2, \ldots, s|1, 2, \ldots, s)$, which may be determined from equation (12).

$$P(s+1, 1, 2, \ldots, s) = \quad (12)$$
$$P[V(s+1)>V(1)] \cdot P[V(s+1)>V(2)] \ldots P[V(s+1)>V(s)]$$

The more efficient technique then calculates $P(1, s+1, 2, \ldots, s|1, 2, \ldots, s)$, which may be determined from equation (13).

$$p(1, s+1, 2, \ldots, s \mid 1, 2, \ldots, s) = \qquad (13)$$

$$\frac{P(s+1, 1, 2, \ldots, s \mid 1, 2, \ldots, s)}{P[V(s+1) > V(1)]\{1 - P[V(s+1) > V(1)]\}}.$$

The more efficient technique proceeds through all of the possible orders moving the sth+1 to-be-executed operation through the order and maintaining the maximum calculated P as well as its associated order as the candidate order until calculating P(1, 2, . . . , s, s+1|1, 2, . . . , s). When done the candidate order is the sorted order for the to-be-executed operations θ(1), θ(2), . . . , θ(s), θ(s+1). Then, if there is an sth+2 operation to add to the sorted order, the more efficient technique is performed on the set including the sth+2 operation.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method comprising the steps of:
a computing entity:
storing a training data set comprising previously executed operation pairs, attribute data, and relative cost data, the attribute data for each previously executed operation pair comprising first attribute data for a first previously executed operation and second attribute data for a second previously executed operation, the relative cost data for each previously executed operation pair comprising a relative cost indicator between the first and second previously executed operations, wherein the relative cost indicator is a value representing a comparison between respective costs of the first and second previously executed operations;
forming a predictor from the training data set; and
applying the predictor to an operation pair of first and second to-be-executed operations to determine a predicted relative cost between the first and second to-be-executed operations.

2. The method of claim 1 wherein the computing entity includes a computer.

3. The method of claim 1 wherein the computing entity includes a plurality of computers.

4. The method of claim 1 wherein the previously executed operation pairs comprise previously executed computer processing jobs.

5. The method of claim 4 wherein the previously executed computer processing jobs comprise previously executed multi-task computer processing jobs.

6. The method of claim 5 wherein the multi-task computer processing jobs include multi-stage computer processing jobs.

7. The method of claim 1 wherein the first and second attribute data for the corresponding first and second previously executed operations each comprises a plurality of attributes.

8. The method of claim 1 wherein the relative cost indicator indicates whether the first previously executed operation has a first cost that exceeds a second cost for the second previously executed operation.

9. The method of claim 1 wherein the attribute data is selected from a project identifier, one or more computer processing operation types, one or more computer processing task types, a user or user group, one or more input metrics, one or more output metrics, and a combination thereof.

10. The method of claim 1 wherein the cost of each of the first and second previously executed operations is selected from resource usage, execution time, processing time, critical path length, total processing time, and a combination thereof.

11. The method of claim 1 wherein the predictor comprises a probability classifier.

12. The method of claim 11 wherein the probability classifier includes a plurality of attribute classification tables.

13. The method of claim 12 wherein the step of forming the predictor places counts of true and false instances of whether a first cost of the first previously executed operation exceeds a second cost for the second previously executed operation by attribute classes in each attribute classification table.

14. The method of claim 13 further comprising the computing entity converting numeric values of a numeric attribute category into the attribute classes.

15. The method of claim 13 wherein the probability classifier further includes a plurality of conditional probability tables.

16. The method of claim 15 wherein the step of applying the predictor to the to-be-executed operation pairs employs conditional probabilities from the conditional probability tables to determine the predicted relative cost between the first and second to-be-executed operations for each to-be-executed operation pair.

17. The method of claim 16 wherein the predicted relative cost between the first and second to-be-executed operations for each operation pair is a probability that a first cost associated with the first to-be-executed operation at least equals a second cost associated with the second to-be-executed operation.

18. The method of claim 17 wherein the step of employing the to-be-executed operation pairs and the predicted relative costs to sort the to-be-executed operations sorts the to-be-executed operations on a probability basis.

19. The method of claim 11 wherein the probability classifier includes a plurality of combined attribute classification and conditional probability tables.

20. A method of ordering operations comprising the steps of:
a computing entity:
storing a training data set comprising previously executed operation pairs, attribute data, and relative cost data, the attribute data for each previously executed operation pair comprising first attribute data for a first previously executed operation and second attribute data for a second previously executed operation, the relative cost data for each previously executed operation pair comprising a relative cost indicator between the first and second previously executed operations;
forming a predictor from the training data set;
applying the predictor to to-be-executed operations in to-be-executed operation pairs to determine a predicted relative cost between first and second to-be-executed operations for each to-be-executed operation pair, thereby determining predicted relative costs for the to-be-executed operation pairs; and
employing the to-be-executed operation pairs and the predicted relative costs to sort the to-be-executed operations into a list.

21. The method of claim 20 wherein the computing entity includes a computer.

22. The method of claim 20 wherein the computing entity includes a plurality of computers.

23. The method of claim 20 wherein the previously executed operation pairs comprise previously executed computer processing tasks.

24. The method of claim 23 wherein the previously executed computer processing tasks comprise previously executed multi-task computer processing jobs.

25. The method of claim 24 wherein the multi-task computer processing jobs include multi-stage computer processing jobs.

26. The method of claim 20 wherein the corresponding first and second attribute data for the first and second previously executed operations each comprises a plurality of attributes.

27. The method of claim 20 wherein the relative cost indicator indicates whether the first previously executed operation has a first cost that exceeds a second cost for the second previously executed operation.

28. The method of claim 20 wherein the attribute data is selected from a project identifier, one or more computer processing operation types, one or more computer processing task types, a user or user group, one or more input metrics, one or more output metrics, and a combination thereof.

29. The method of claim 20 wherein the relative cost data is selected from resource usage, execution time, processing time, critical path length, total processing time, and a combination thereof.

30. The method of claim 20 wherein the predictor is selected from a probability classifier, a decision tree classifier, a nearest neighbor classifier, a rule based classifier, a linear classifier, a support vector machine classifier, and a combination thereof.

31. The method of claim 20, wherein the relative cost indicator is a value representing a comparison between respective costs of the first and second previously executed operations.

32. A non-transitory computer readable medium comprising computer code for implementing a method comprising:
    storing a training data set comprising previously executed operation pairs, attribute data, and relative cost data, the attribute data for each previously executed operation pair comprising first attribute data for a first previously executed operation and second attribute data for a second previously executed operation, the relative cost data for each previously executed operation pair comprising a relative cost indicator between the first and second previously executed operations, wherein the relative cost indicator is a value representing a comparison between respective costs of the first and second previously executed operations;
    forming a predictor from the training data set; and
    applying the predictor to an operation pair of first and second to-be-executed operations to determine a predicted relative cost between the first and second to-be-executed operations.

33. A non-transitory computer readable medium comprising computer code for implementing a method of ordering operations, the method of ordering the operations comprising the steps of:
    storing a training data set comprising previously executed operation pairs, attribute data, and relative cost data, the attribute data for each previously executed operation pair comprising first attribute data for a first previously executed operation and second attribute data for a second previously executed operation, the relative cost data for each previously executed operation pair comprising a relative cost indicator between the first and second previously executed operations;
    forming a predictor from the training data set;
    applying the predictor to to-be-executed operations in to-be-executed operation pairs to determine a predicted relative cost between first and second to-be-executed operations for each to-be-executed operation pair, thereby determining predicted relative costs for the to-be-executed operation pairs; and
    employing the to-be-executed operation pairs and the predicted relative costs to sort the to-be-executed operations into a list.

34. The computer readable medium of claim 33, wherein the relative cost indicator is a value representing a comparison between respective costs of the first and second previously executed operations.

* * * * *

UNITED STATES PATENT AND TRADEMARK OFFICE
CERTIFICATE OF CORRECTION

PATENT NO. : 7,930,700 B1
APPLICATION NO. : 11/135576
DATED : April 19, 2011
INVENTOR(S) : Sujoy Basu et al.

Page 1 of 1

It is certified that error appears in the above-identified patent and that said Letters Patent is hereby corrected as shown below:

In column 8, line 16, after "the" insert -- sum of the --. second occurrence

In column 10, line 62, delete " $P(s+1, 1, 2, \ldots, s) =$ " and insert -- $P(s+1,1,2,\ldots,s \mid 1,2,\ldots,s) =$ --, therefor.

Signed and Sealed this
Twentieth Day of September, 2011

David J. Kappos
*Director of the United States Patent and Trademark Office*